United States Patent [19]
Phillips et al.

[11] 4,385,525
[45] May 31, 1983

[54] STRAIN GAUGE PRESSURE TRANSDUCER

[75] Inventors: James W. Phillips, Michigan City; Gregory Dirks, La Porte, both of Ind.

[73] Assignee: Dwyer Instruments, Inc., Michigan City, Ind.

[21] Appl. No.: 303,628

[22] Filed: Sep. 18, 1981

[51] Int. Cl.³ .............................................. G01L 9/04
[52] U.S. Cl. ....................................... 73/720; 338/4; 338/42
[58] Field of Search ............... 338/4, 42; 73/720, 721, 73/862.63, 862.64, 862.67, 726, 727; 324/115, 157

[56] References Cited

U.S. PATENT DOCUMENTS

| | | | |
|---|---|---|---|
| 3,343,420 | 9/1967 | Kondo et al. | 73/720 |
| 3,389,362 | 6/1968 | McLellan | 73/720 |
| 3,559,488 | 2/1971 | Weaver | 73/720 |
| 3,780,588 | 12/1973 | Whitehead et al. | 73/721 |
| 4,017,819 | 4/1977 | Pien | 338/4 |

*Primary Examiner*—Donald O. Woodiel
*Attorney, Agent, or Firm*—McWilliams, Mann, Zummer & Sweeney

[57] ABSTRACT

A strain gauge pressure transducer comprising a housing having an internal pressure cavity across which is mounted a flexible elastomeric diaphragm that separates high and low pressure chambers in the gauge that the housing is arranged to separately connect the sources of high and low pressure, respectively. A range spring in the form of a leaf spring is anchored to the housing cantilever fashion in the high pressure chamber and to one side of the diaphragm to dispose the live length of same, as defined by a clamp device, in overlying relation to the diaphragm, to which the leaf spring live length is connected for deflecting movement thereof by the diaphragm. The leaf spring has fixed to its live length a strain gauge in the form of four square grid etched foil sensing elements of the self temperature compensated type connected in Wheatstone bridge fashion that forms an electro-mechanical transducer that is powered by an electronic circuit mounted inside the gauge on a printed circuit board that is in overlying relation to and spaced from the leaf spring, which when energized supplies a constant direct voltage, to the strain gauge. Deflection of the leaf spring live length under deflection of the diaphragm in response to fluid pressure applications to the high and low pressure chambers unbalances the strain gauge from a null relation and effects a corresponding change in the strain gauge signal which is amplified and converted by the electronic circuit to a low output that is supplied to instrumentation such as a controller or recorder. The electronic circuit has internal adjustments that provide for adjustment of the range or span of the transducer, and the zero operating point of the transducer.

10 Claims, 9 Drawing Figures

U.S. Patent May 31, 1983 Sheet 1 of 4 4,385,525
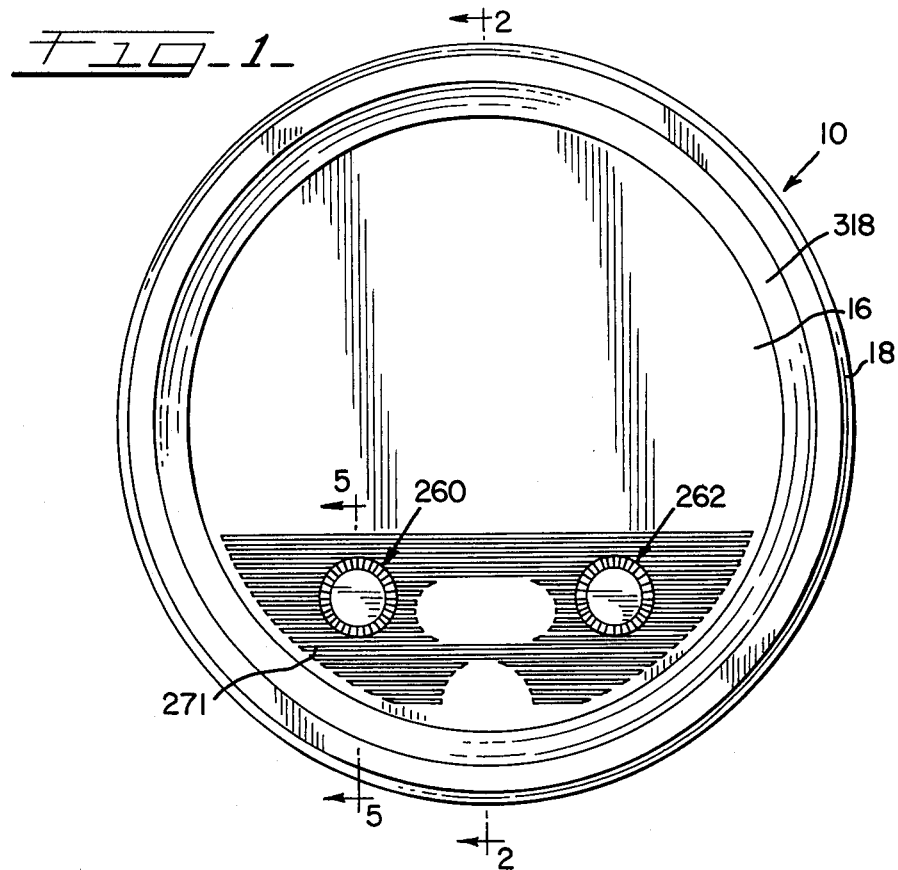
Fig-1-
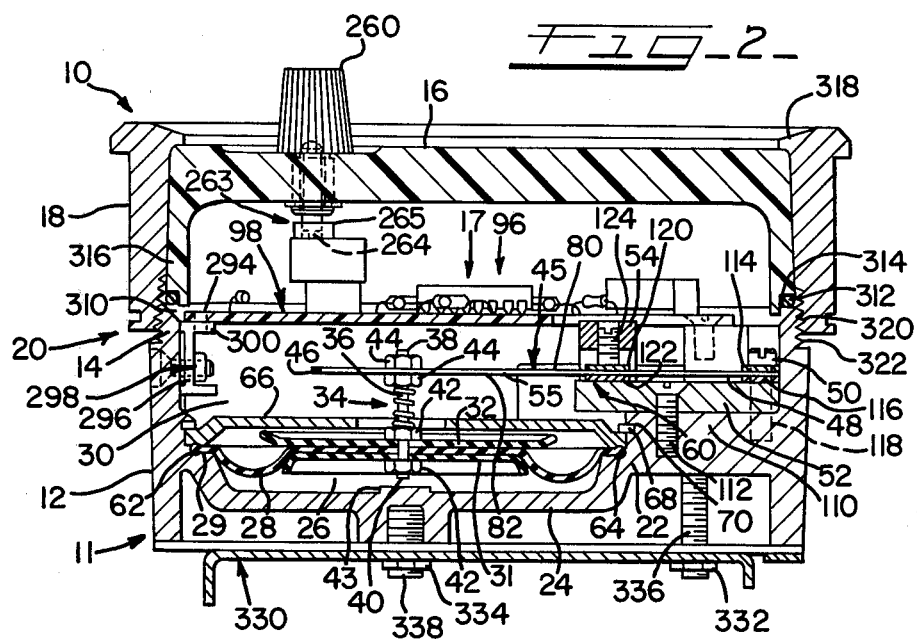
Fig-2-

STRAIN GAUGE PRESSURE TRANSDUCER

STRAIN GAUGE PRESSURE TRANSDUCER

This invention relates to a strain gauge pressure transducer, and more particularly, to pressure transducers of the type in which the pressure or pressure differentials are directly applied to a diaphragm, and the deflection of the diaphragm is in turn sensed by an electromechanical transducer that in turn produces an electrical signal that is proportional to the pressure on the diaphragm, which signal may then be transmitted to a receiving indicating meter, a process controller, or a computer.

Heretofore, in pressure monitoring transducers of the type indicated, the diaphragam is typically in the form of a metallic plate of thin thickness dimension, to which is applied directly the strain gauge that is electrically connected to form the transducer directly on the diaphragm. In some models, a single diaphragm is employed, while in others two diaphragms are employed that may be connected together for providing a common deflection action, with only one of the diaphragms having the sensing strain gauge applied to same. The pressure being monitored is suitably applied to a body of silicone oil or the like that in turn affects the deflection of the diaphragm or diaphragms that are provided to monitor the pressure through operation of the sensing strain gauge. Conventionally, instruments of this type are not sensitive enough for low pressure applications below about 6 inches of water column, though they operate in pressure ranges of up to about 300 psi.

In order to make instruments of this type more sensitive, the conventional approach has been to enlarge the working area of the diaphragm, and thus enlarge the diaphragm itself, which tends to make the diaphragm more subject to the overpressure breakage problem that is so commonly experienced with devices of this type. The more sophisticated models have built into them complexities for protecting the diaphragm from overpressure breakage.

Thus, conventional devices of this type have come to be rather large, complicated, and cumbersome that require highly trained and experienced personnel to set up and operate, and at have a relatively high cost that runs in the neighborhood of $800.00 per unit.

A principal object of the present invention is to provide a simplified, relatively low cost, strain gauge pressure transducer in which the sensing diaphragm may be of the conventional inexpensive elastomeric type that is applied across a pressure cavity to form high and low pressure chambers on either side of same that are adapted for application thereto of the fluid mediums, the pressures of which are to be measured or monitored, with the transducer itself being of the strain gauge type and applied to a separate spring steel leaf spring that is spaced from and is separate and distinct from the elastomeric diaphragm, but is connected thereto for movement thereby in response to the action of the fluid pressures or pressure acting on the diaphragm.

Another principal object of the invention is to provide a strain gauge pressure transducer in which the pressure induced deflection that is to provide the strain gauge generated signal is applied to an elastomeric diaphragm that is linkage connected to a separate cantilever mounted leaf spring clamped in place to have an active length that is to be deflected as the diaphragm is deflected, onto which the strain gauge is to be applied in deflection sensing relation thereto.

Another important principal object of the invention is to provide a strain gauge pressure transducer in which a flexible elastomeric diaphragm is deflected by the fluid mediums whose pressure or pressures are being measured or monitored, which deflection is directly transmitted to the live length of a cantilever mounted leaf spring provided in overlying relation to the diaphragm for this purpose, with the leaf spring live length having mounted on same a strain gauge arranged Wheatstone bridge fashion and bonded to the leaf spring live length whereby low pressure sensitivity increase is made available by way of the strain gauge-spring steel leaf spring assembly that is separate from but operated by the diaphragm, rather than continuing to pursue the apparent dead end approach of attempting to increase sensivity using conventional metallic diaphragms by making such diaphragms larger in effective working area.

Yet another important object of the invention is to provide a strain gauge pressure transducer gauge of few and simple basic mechanical parts, employing as the major mechanical components the housing, that is formed to define the pressure cavity, the elastomeric diaphragm that is applied across the housing cavity to form the instrument high and low pressure chambers on either side of same, and a leaf spring type range spring of the type shown in Phillips and Zoludow U.S. Pat. No. 3,862,416, with which range spring is associated a sensing element type strain gauge in special combination with the leaf spring for self acting temperature compensation and low input voltage excitation requirements that minimize heating of the sensor elements with consequent error reduction.

Still another important object of the invention is to provide a strain gauge pressure transducer gauge in which the strain gauge exciting voltage is provided by an electronic circuit mounted on a printed circuit board and housed totally within the gauge housing that is in turn energized from a conventional readily available regulated power supply to provide a constant of the strain gauge that, when deflection of the diaphragm and leaf spring actuated thereby occurs, results in the provision of a milli-amp or milli-volt output in the range of from about 4 to about 20 milli-amps, or from about one to about 5 milli-volts that may be transmitted to a receiving indicating meter, a process controller, or a computer.

Yet a further object of the invention is to provide a strain gauge pressure transducer especially adapted for lower fluid pressure applications in the range of from 0 to 0.25 inches of water column to 10 to 15 psi., that is composed of few and simple basic mechanical parts, that is inexpensive of manufacture and assembly, and that is readily employed in application and long lived and accurate in use.

In accordance with the invention, the strain gauge pressure transducer comprises a housing defining an internal pressure cavity and a bottom wall that is recessed for application over same of a flexible elastomeric diaphragm that separates high and low pressure chambers in the gauge, with the low pressure chamber being on the housing bottom wall side of the diaphragm and the housing including a cover for closing off the open side of same to complete the high pressure chamber. A range spring in the form of a leaf spring similar to that disclosed in said Phillips and Zoludow patent is anchored to the housing cantilever fashion in the high pressure chamber, and to one side of the diaphragm, to dispose the live length of the leaf spring in overlying relation to the diaphragm, to which the leaf spring live length is connected for deflecting movement thereof by the diaphragm in response to pressure changes in the instrument high and low pressure chambers. The spring live length is defined by the leaf spring being clamped to the housing adjacent the diaphragm periphery. The leaf spring has fixed to its live length a strain gauge which in the illustrated embodiment is in the form of four square grid etched foil sensing elements of the self temperature compensated type, connected in Wheatstone bridge fashion, that form an electro-mechanical transducer that is powered by an electronic circuit mounted inside the gauge on a printed circuit board that is disposed in overlying relation to and spaced from the leaf spring, which electronic circuit when energized by a suitable regulated power supply supplies a constant voltage to the strain gauge. Deflection of the leaf spring live length under deflection of the diaphragm unbalances the strain gauge and effects a corresponding change in the strain gauge signal which is amplified and converted by the electronic circuit to an output in the range of from about 4 to about 20 milli-amps or from about one to about 5 milli-volts that may be supplied to instrumentation such as a receiving indicating meter, a recorder, or a process controlling computer or controller. The circuit has two internal adjustment that provide for adjustment of the range or span of the transducer, and the zero operating point of the transducer.

Other objects, uses, and advantages will be obvious or become apparent from a consideration of the following detailed description and the application drawings in which like reference numerals indicate like parts throughout the several views.

In the drawings:

FIG. 1 is a face or top plan view of one embodiment of the invention, taken as viewed by an observer viewing the instrument from above the left hand side of FIG. 2;

FIG. 2 is a transverse cross-sectional view through the instrument taken substantially along line 2—2 of FIG. 1;

Figure 3:
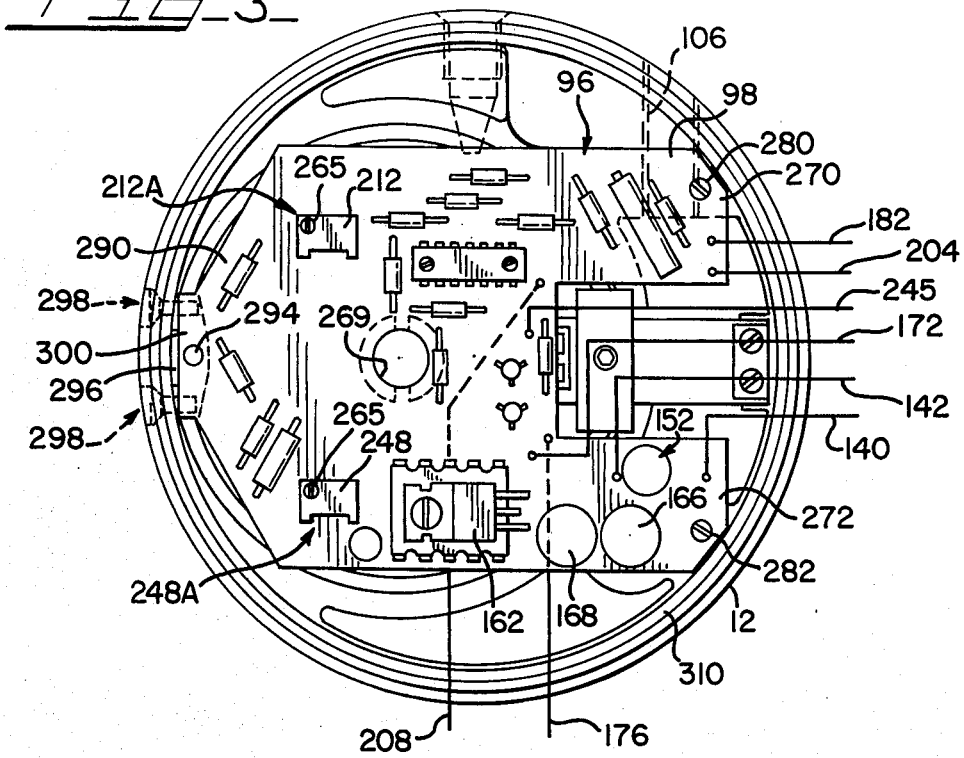
FIG. 3 is a top plan view of the instrument housing, with the gauge cover removed, and viewed as looking from the top of FIG. 2.

However, it is to be distinctly understood that the specific drawing illustrations provided are supplied primarily to comply with the requirements of the Patent Laws, and that the invention is susceptible of modifications and variations that will be obvious to those skilled in the art, which are intended to be covered by the appended claims.

GENERAL DESCRIPTION

Reference numeral 10 of FIGS. 1 and 2 generally indicates one embodiment of the invention in which the pressure gauge 10 comprises a housing 11 that includes housing member 12, that may be formed from a suitable metallic material, such as aluminum or aluminum alloy, or a suitable plastic, having open end 14 closed by a cover 16 to form the gauge pressure cavity 17. Cover 16 is preferably formed from an opaque rigid high strength plastic material, such as polyethylene, or polycarbonate, held in place by annular cap or bezel 18 (that may be formed from the same material as housing member 12) threadedly secured to the housing member 12 as indicated at 20 (see FIG. 2).

The housing member 12 includes rear wall 22 defining a saucer shaped portion 24 which, in the form illustrated, forms a stationary wall for low pressure chamber 26 that is defined from cavity 17 by flexible diaphragm 28 that is preferably formed from silicone rubber or its equivalent and that is suitably mounted in place at its rim 29 to define a high pressure chamber 30 on the other side of same. Diaphragm 28 in the form illustrated is fastened between reinforcing plates 31 and 32, at the center of the diaphragm, to connecting link 34 that comprises a rod element 36 having its ends 38 and 40 threaded, to which nuts 42 are applied to either side of the plates 31 and 32 on the end 40 to clamp the diaphragm in leakage-free relation therebetween (boss 43 serving as a stop for the link 34 in the illustrated embodiment).

Operably associated with diaphragm 28 is range spring 45 in the form of leaf spring 46 that is cantilever mounted at its end 48, as by employing suitable screws 50, which are applied to the housing member rear wall 22 in such a manner as to clamp the end 48 of the leaf spring 46 against a housing mounted slide structure 52 which mounts a U shaped clamp 54 for adjusting the live length 52 of the spring 46, as per the arrangement shown in Locke U.S. Pat. No. 3,397,319.

Nuts 44 applied to the end 38 of the rod member 36 and disposed on either side of the leaf spring 46 (through which rod member 36 thus passes) connect the rod element 38 and thus the diaphragm 28 to the leaf spring to form a lost motion free, motion transmitting, connection between the live length 55 of the leaf spring and the diaphragm, which will thus swing the live length 55 of the leaf spring about fulcrum 60 that is established by the action of the clamp 54 on leaf spring 46.

The general arrangement of the housing member 12 and the mounting of diaphragm 28 may be substantially as disclosed in said U.S. Locke Pat. No. 3,397,319. The diaphragm 28 at its margin 29 is formed with continuous bead 62 that is received in groove 64 formed in the housing member 12 about the saucer shaped portion 24 and is held in place by the saucer shaped plate 66 being secured in place against the diaphragm rim 29 and its bead 62 by suitable lock ring 68 applied to circular recess 70 formed in the housing member 12.

Further in accordance with the invention, leaf spring 46, and specifically, its live length 55, has bonded to its upper side surface 80, as distinguished from its underside surface 82, a full Wheatstone bridge strain gauge 84 in the form of four square grid etched foil sensing elements 86, 88, 90 and 92 that are connected together in Wheatstone bridge fashion that forms an electromechanical transducer 94 that is powered by electronic circuit 96 mounted inside the gauge 10 and specifically in its high pressure chamber 30 on an associated printed circuit board 98. As will be apparent from the showing of FIG. 2, the circuit board 98 is applied to the housing member 12 in overlying relation to and spaced from the leaf spring 46 so as to not interfere with the deflections of the leaf spring live length 55 that are effected by deflections of the diaphragm 28.

Figure 4:
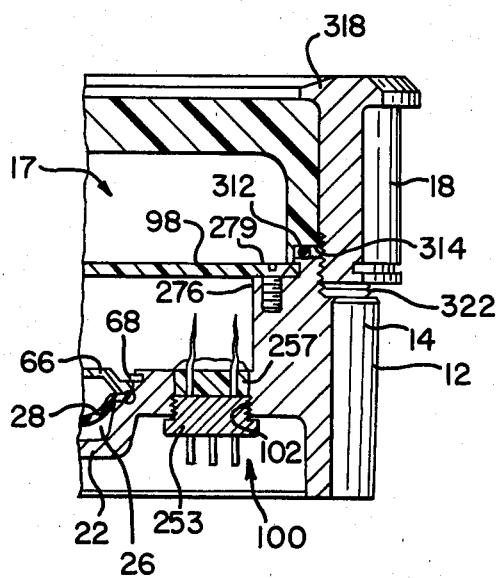
FIG. 4 is a fragmental transverse cross-sectional view taken substantially along line 4—4 of FIG. 6.
Figure 6:
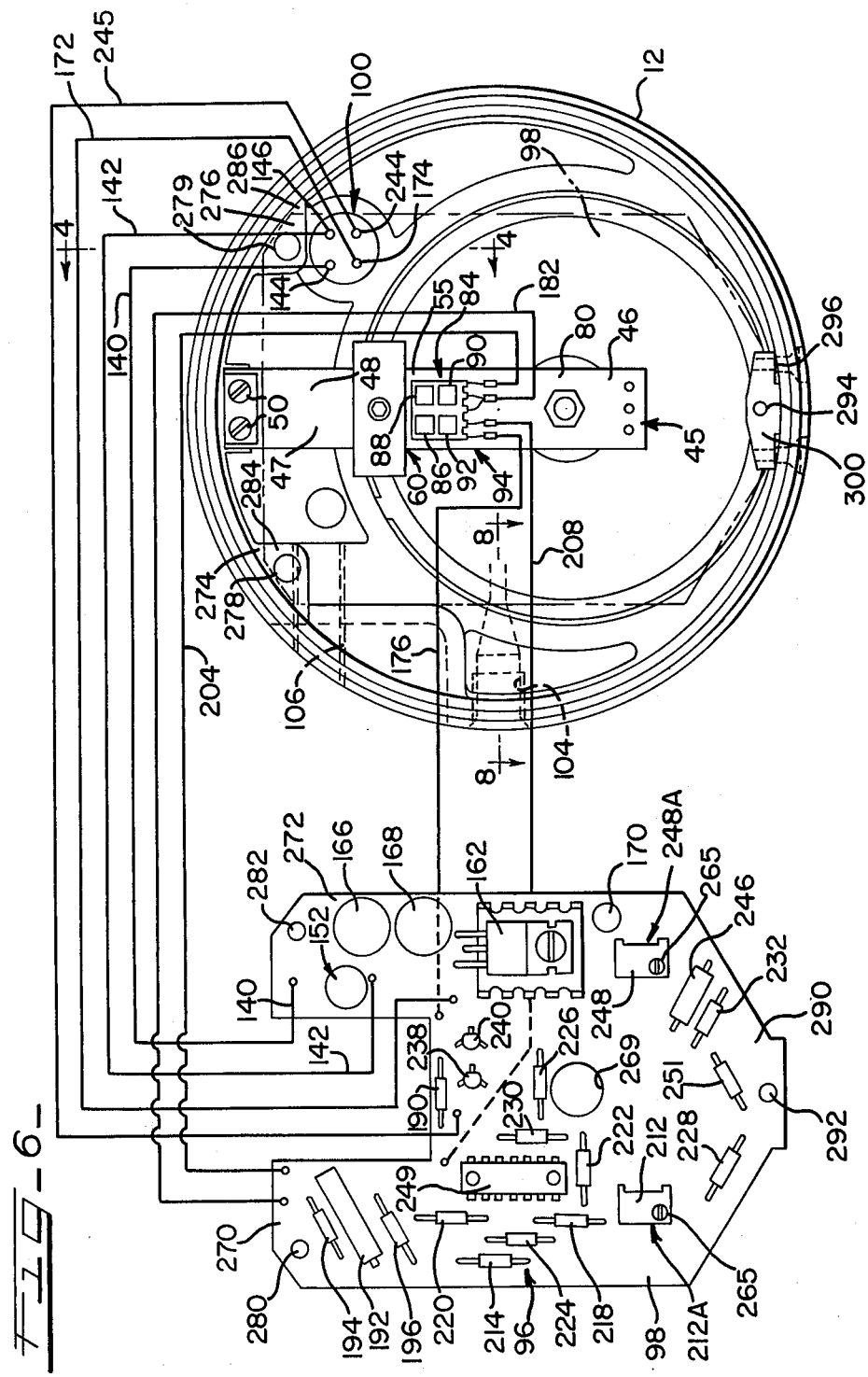
FIG. 6 is a view similar to that of FIG. 3, but with the circuit board and electronic components carried by same shown displaced from the housing and to one side of same, with the electrical connections between the leaf spring strain gauge and the housing plug assembly being shown diagrammatically, and also showing in dashed lines the connections to the respective high and low pressure chambers.
Figure 9:
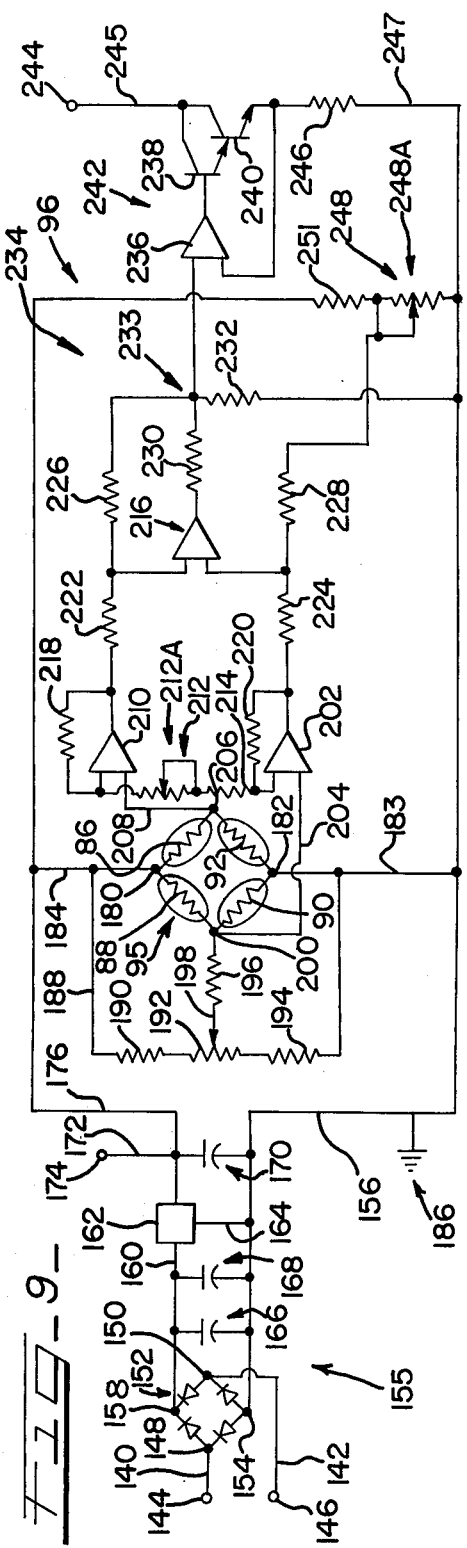
FIG. 9 is a wiring diagram illustrating the circuitry in which the leaf spring strain gauge and associated electronic components and connections are integrated for the practice of the invention.

Electronic circuit 96 and its components and connections are diagrammatically and schematically illustrated in FIGS. 6 and 9, with the connections being operably associated with the housing plug assembly 100 (see FIGS. 4 and 6) that is suitably affixed in leak free relation to the housing member 12 by being mounted in the housing aperture 102 formed for this purpose (see FIG. 4).

As will be made clear from the specific description that follows, the electronic circuit 96 functions to supply a constant direct voltage ordinarily to the strain gauge 84 to form the transducer 94, with the electronic circuit 96 being connected through plug assembly 100 to a suitable regulated power supply (not shown) for energization purposes.

The housing member 12 is formed to define the usual threaded socket and associated boring generally indicated by reference numerals 104 and 106 that provides the housing connections for the high and low pressure chambers 26 and 30 to sources of high and low fluid pressure, respectively, assuming that the appropriate connections have been made to establish communication between the high and low pressure chambers respectively and the indicated high and low pressure fluid sources, and, of course, assuming electronic circuit 96 is electrically connected to the indicated regulated power supply, and the range or span of the transducer and the zero operating point of the transducer have been determined as hereinafter described, a change in the application of the pressures to either chamber 26 or 30 results in a corresponding deflection of the diaphragm 28, and through link 34, a corresponding deflection of the live length 55 of leaf spring 46, which creates a change in the strain gauge resistance that unbalances the strain gauge and creates a signal that is a proportion to the difference in the pressure change involved that is amplified and converted by the electronic circuit to an output in the range of from about 4 to about 20 milliamps, or from about one to about 5 milli-volts which output can be suitably electrically connected through plug assembly 100 to a suitable conventional measuring instrument, recording instruments, or process controlling equipment such as computers and controllers.

It is to be noted that in the pressure gauge arrangement of this invention, the diaphragm that is directly deflected by changes in the pressure applied to either side of same is basically an elastomeric component, the reinforced portion of which is not subject to flexing stress, with the strain gauge that actually senses the pressure changes being applied to spring steel leaf spring 46 that is directly connected to the diaphragm for movement thereby by link 34. Thus, the sizing of the diaphragm 28 need not be concerned with the need for the sensing strain gauge to be applied thereto in terms of effecting ultra low pressure operation. Rather, the sizing of the diaphragm may be of any thickness or proportion or diameter that serves the general purposes of the instrument and effectively prevents overpressure damage thereto.

On the other hand, the nature and assembly of the strain gauge forming components and the spring steel leaf spring are such as to provide for self temperature compensation of the strain gauge.

SPECIFIC DESCRIPTION

Leaf spring 46 is formed from a suitable tempered spring steel material, such as Sandvik C-1095 hardened and bright tempered spring steel or the alternate blue tempered version of the same product. Leaf spring 46 in practice is mounted in its operating position by having the slide bar 52 secured on top of housing member pedestle forming rib 110, as by employing suitable mounting screw 112 with the leaf spring end 48 being received between upper and lower clamping plates 114 and 116 and secured in place by the screws 50 which pass through the mounting plates 114 and 116 as well as leaf spring 46 and slide bar 52 into threaded securement in the respective thread bores 118 formed in the housing member 12. At the clamp 54, the leaf spring 46 is received between upper and lower clamping plates 120 and 122, with the lower clamping plate 122 resting on top of the slide bar 52 and set screw 124 that is threadedly received in clamp 54 bearing against the upper plate 120 to clamp the leaf spring against the slide bar 52 and define the live length 55 of the leaf spring and fulcrum 60.

The strain gauge elements 86, 88, 90 and 92 each comprise, in the illustrated embodiment, square grid foil elements of a commercially available type, with a preferred form comprising the elements in question being photoetched in squared grid form from constantan foil having a thickness of approximately 0.0003 inch. Constantan is a copper-nickel alloy with a low and controllable temperature coefficient of expansion. The foil elements in practice are suitably affixed to a carrier or backing comprising a suitable resin material, such as epoxy phenolic resin that is in turn bonded to the leaf spring surface 80 utilizing a bonding material such as the BR-610 two part high performance epoxy resin available from William T. Bean Inc., of Detroit, Michigan or its equivalent, in association with foil connectors of suitable configuration and of the same alloy.

Sensing elements 86, 88, 90, and 92 have a relatively large ratio of surface area to cross sectional area, for instance approximately 190 to 1, which provides for greater stability under prolonged loading periods and enables the strain gauge 84 to better follow temperature changes in leaf spring area underlying gauge 84 and to efficiently dissipate self-induced heat. The gauge factor of strain gauge sensing elements, which is the ratio of the change of resistance for each unit of resistance in the respective elements (ohms per ohm) to the strain imposed on the sensing element (inches per inch) is preferably about 2.1 for the indicated application.

A feature of the invention is that the elements 86, 88, 90 and 92 have their grids oriented relative to each other in the manner indicated in FIG. 6 whereby the griding of the elements 88 and 92 extend transversely of the leaf spring whereby such elements are oriented relative to the leaf spring solely for temperature compensation purposes, while the grids of the elements 86 and 90 extend longitudinally of the leaf spring 46, and thus are oriented for sensing deflection of the portion of the live length of the leaf spring to which they are applied. Deflection of the leaf spring changes the length and thus the cross-sectional area of the grids of elements 86 and 90, which thus effects a change in the electrical resistance of such elements whereby the transducer 94 is operative to signal the pressure change that has occurred.

It is preferred that the geometry of the sensing elements and their contacts or tabs be arranged in accordance with conventional practices for full Wheatstone bridge configuration and connections and to be as compact as possible. In the preferred embodiment each element 86, 88, 90 and 92 has a resistance of about 350 ohms, and said elements are matched for temperature compensation purposes.

Figure 7:
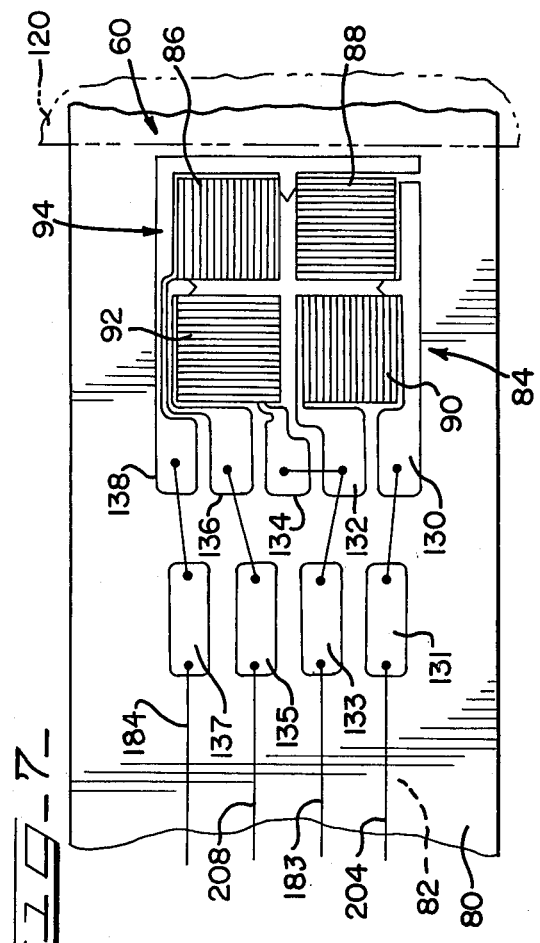
FIG. 7 is a large scale diagrammatic fragmental view of the portion of the leaf spring live length that bears the strain gauge and connectors therefor and the general arrangement of the strain gauge.

Elements 86, 88, 90 and 92 as embodied in their carriers and associated with their contacts or tabs 130, 132, 134, 136 and 138 in full Wheatstone bridge, self temperature compensated, fashion and connection are commercially available from several sources, such as Electrix Industries Inc., Lombard, Illinois (its Quad gauge QT-06-350), Micromeasurement Inc. of Raleigh, North Carolina (its Model No. MA-09-120NC-350), and BLH Electronics Co. of Waltham, Massachusetts. The gauge 84 is applied to the leaf spring 46 in the Wheatstone bridge arranged so that when the leaf spring is totally planar, the Wheatsone bridge will be balanced. The Wheatstone bridge in question is indicated in FIG. 9 by reference numeral 95 and is formed on leaf spring 46 in association with suitable terminals 131, 133, 135, and 137 etch formed from copper foil and applied to carriers of the same type as the sensing elements of strain gauge 84, that are in turn bonded to the leaf spring surface 80 in the same manner as the sensing elements of strain gauge 84. In this connection, it is important that the strain gauge 84 be located on the leaf spring so as to be closely adjacent the fulcrum 60, but on the live length side of such fulcrum (as indicated in FIGS. 2, 6 and 7), for maximum sensitivity, as this is the location of the greatest flexing of the leaf spring under the deflection action of diaphragm 28 through link 34.

Elements 88 and 92 of bridge 95 form the compensating part of transducer 94 and insofar as temperature effect on the strain gauge 84 is concerned, such part is a duplicate of the deflection signal generating part of transducer 94; the bridge connections of elements 86, 88, 90, and 92 orient these components so that any change in resistance in signal generating elements 86 and 98 that is caused by temperature is cancelled by an identical temperature compensating change in the resistance of elements 88 and 92.

The electronic circuit 96 is schematically illustrated in FIG. 9 in association with the strain gauge Wheatstone bridge 95, with the major wiring connections being diagrammatically illustrated in FIG. 6 wherein leads 140 and 142 respectively extend between contacts 144 and 146, respectively, and contacts 148 and 150 of full-ware bridge rectifier 152 of power regulator portion 155 of circuit 96. Contact 154 of bridge rectifier 152 is connected to lead 156 while contact 158 of bridge rectifier 152 is connected to lead 160 that is connected to suitable positive voltage regulator 162 that is connected across the line to lead 156 by suitable connector 164, as are suitable filtering capacitors 166, 168, and 170. Connector 172 connects plug terminal 174 to lead 176.

The power inlet to the circuit 96 at terminals 144 and 146 preferably is from a suitable regulated power supply connected to these terminals of plug assembly 100 and may either be in the range from about 20 to about 30 volts direct current (D.C.) or in the range of from about 18 to about 26 volts alternating current (A.C.). Where alternating current is supplied, the bridge 152 rectifies it with the positive voltage regulator 162 being conventionally arranged to have an output of 15 volts direct current. Alternately, the 15 volts direct current supply may be applied to terminal 174.

The leads 156 and 176 are connected to terminals 182 and 180 of the strain gauge Wheatstone bridge 95 by leads 183 and 184, respectively, with the lead 156 being suitably connected to ground 186. Lead 188 electrically connects connectors 183 and 184 through suitable resistors 190, 194 and 196 and potentiometer 192 that form a balancing function about to be described, in association with resistor 196 of lead 198 that is connected to terminal 200 of strain gauge bridge 95, the latter terminal also being connected to suitable amplifier 202 by lead 204. The terminal 206 of strain gauge bridge 95 is connected by lead 208 to suitable amplifier 210. Appropriately connected between amplifier 202 and 210 in series are potentiometer type resistor 212 that forms the gauge span adjuster or operating range, and resistor 214. The resistors 190, 194 and 196 and potentiometer 192 form the balance for the strain gauge bridge 95 to null the current measurable across resistors 212 and 214 to the extent that the sensing elements of the strain gauge 95 have variant resistance due to manufacturing tolerances. The nulling action at this point is provided to keep the interaction between the gauge span adjust and the about to be described gauge zero adjust to a minimum.

Potentiometer 212 operates in association with resistor 214 whereby the lower the resistance across same the higher the fluid pressure will be handled by the gauge, and vice versa, depending on the gauge span desired.

The amplifiers 202 and 210 together with amplifier 216 and the resistors 218, 220, 222, 224, 226, 228, 230 and 232 are suitably connected together to form current amplifier 234 that accepts the signal from bridge 95 and amplifies the signal to approximately 20 milli-amps full scale. Should an over voltage signal be experienced from the strain gauge bridge 95, resistors 230 and 232 form a current limitor 233 that restricts the output available from the current amplifier 234.

Suitable amplifier 236 and suitable transistors 238 and 240 form a final current amplifier to current converter device 242 for providing for current output at the plug assembly terminal 244 via connector 245, the value of which is determined by the voltage drop across resistor 246 in lead 247 connecting to ground 186.

The gauge zero adjust is provided by potentiometer 248, in association with resistor 251.

Thus, the potentiometer 212 defines a gauge span adjust that is indicated by reference numeral 212A, and the potentiometer 248 forms the gauge zero adjust, indicated by reference numeral 248A.

The potentiometers, amplifier, transistors, and other electronic components involved except bridge 95 are conventional devices commercially available at most suppliers of such equipment.

The arrangement of the electronic circuit 96 is such that assuming the indicated regulator power supply is made available to the leads 140, 142 or 172 in one of the manners indicated, so long as leaf spring 46 remains free of deflection, the bridge 95 remains balanced and no signal is available at the terminal 244 except what the potentiometer is adjusted for. The regulated power supply to circuit 96, of course, is started when the housing fluid pressure connections 104 and 106 are suitably connected to the sources of the fluid pressure involved. Where gauge pressures are to be measured or sensed, the housing connection 104 remains open to atmosphere and the housing connection 106 is connected to the source of pressure being measured, which is thus connected to the gauge high pressure chamber 30. Where differential pressures are to be measured or sensed, the low pressure source is connected to the housing connection 104 and the high pressure source is connected to the housing connection 106.

In any event, the application of fluid pressures to the gauge 10 that cause deflection of diaphragm 28 result in a corresponding deflection in the leaf spring live length 55, which unbalances the strain gauge 84 and initiates the signal provided by the circuit 96, which varies in proportion to the displacement of the leaf spring live portion from its non deflected relation relative to the fixed length 47 of same and fulcrum 60. The terminal 244 of plug assembly 100 is suitably connected to the instrumentation that is to monitor the signal of gauge 10, and for normal functioning purposes, the zero adjust 248A is set to provide a nominal current of, for instance, 4 milli-amps at terminal 244 when the bridge 95 is balanced, depending on the application, whereby a minimum signal is provided by the gauge when the diaphragm is subject to the same pressures on either side of same and thus spring 46 is free from its indicated deflection, and thus is in non-deflected, planar configuration or relation. Any deflection of the diaphragm under pressures acting on same deflects the leaf spring accordingly, with the resulting signal change being transmitted through plug assembly terminal 244 and via a suitable connection, to the recording or monitoring equipment involved. The circuitry involved results in an output from circuit 96 of a milli-amp or multi-volt output in the range of from about 4 to about 20 milli-amps or from about 1 to about 5 milli-volts that may be transmitted to a receiving indicating meter, a process controller, or a computer.

In other words, when the pressure at one or both of the pressure sources (to which the transducer 10 is connected) changes, a pressure signal is provided that deflects the transducer diaphragm and thus the leaf spring 46. This in turn produces a bending stress in the strain gauge 84 that effects a change in the cross sectional area of the strain gauge elements involved that results in a resistance change in the strain gauge circuit. It is this resistance change that results in the provision of the transducer monitoring electrical signal that is proportional to the pressure signal and can in turn be modified and amplified to be used in various types of monitoring or controlling systems.

Figure 5:
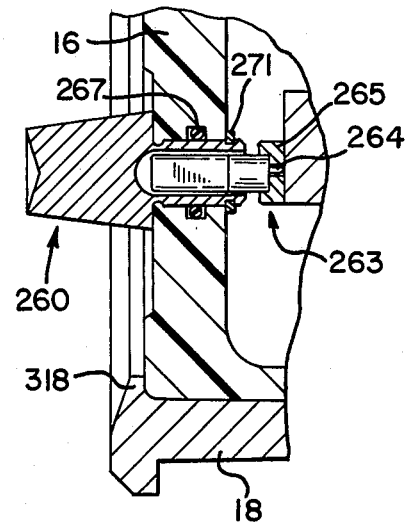
FIG. 5 is a fragmental sectional view taken substantially along line 5—5 of FIG. 1.

In FIGS. 2 and 6 the electronic components and leads connecting same to form the circuit 96 are diagrammatically illustrated with corresponding reference numerals being applied to indicate corresponding components. Amplifiers 202, 210, 216 and 236 are embodied in the four amplifier circuit assembly 249 that is commercially available from National Semiconductor (Part No. LM324, its low quad operational amplifier), as well as other companies offering similar products. Plug assembly 100 is a conventional multi plug input-output connector of any conventional type comprising prong plug body 253 threadedly mounted in aperture 102 and sealed as at 257 with a suitable epoxy resin. In connection with the span adjust 212A and the zero adjust 248A the gauge cover 16 has suitably journaled in same turning knobs 260 and 262, of which knob 260 is coupled to the potientiometer 212 for adjusting the span adjust 212A, while the knob 262 is suitably coupled to potientiometer 248 to effect change of the zero adjust 248A. This may be done in any suitable manner, the knobs 260 and 262 having keyed to same a planar shank 264 adapted to fit into a socket or slot in the rotatable component 265 (see FIGS. 3 and 5) of the respective potientiometers 212 and 248, forming a splined connection 263 that is similar to the corresponding splined connection of said Phillips and Zoludow Pat. No. 3,862,416 (see FIG. 11 of same). Knobs 260 and 262 are permanently mounted in cover 16, as by employing suitable lock rings 271, and are operably engaged by suitable fluid tight O-ring seals 267 for sealing purposes (see FIG. 5) similar to the knob arrangements of said U.S. Pat. No. 3,862,416. Cover 16 may have external decorative indicia 271 for highlighting trademarks and product identification indicia.

Circuit board 98 may be of any conventional type, that ordinarily involves a dielectric, rigid or substantially inflexible, substrate formed from glass-epoxy or phenolic base type materials formed to the desired shape and having the desired conductive surfacing suitable formed thereon (not shown). In the form shown, board 98 is formed with circular aperture 269 that is to be aligned with link 34.

The mounting of the circuit board 98 in housing member 12, assuming that the wiring connections involved are completed, involves resting the tail sections 270 and 272 of the board on the respective housing member pedestles 274 and 276 (see FIG. 6), and applying the respective screws 278 and 279 to same at their respective holes 280 and 282 for threaded connection of the respective screws 278 and 279 to suitable threaded bores formed in the housing member at the respective pedestles 274 and 276, the top mounting surfaces 284 and 286 of which are planar and are in coplanar relation in the plane of the instrument. The head section 290 of the board 98 is formed with aperture 292 to receive mounting screw 294 that makes the board 98 fast to mounting bracket 296 fixed to the housing member 12 by a pair of suitable screw and nut assemblies 298, with the bracket 296 including mounting flange 300 that is threadedly apertured for the purpose of threadedly receiving the screw 294; bracket 296 is also suitably apertured to receive the assemblies 298.

The open end 14 of the housing member 12 is formed to define frustoconical surface 310 against which seats suitable O ring seal 312 that is received in the annular notch 314 formed in the cover side wall 316. The bezel 18 is received over the cover 16 and has annular securement flange 318 integral with the inside rim of same for pressing the seal 312 against housing member surface 310 when the bezel has its internal threading 320 applied in threaded relation to the external threading 322 of the housing member to effect the sealing of the high pressure chamber at the end 14 of the housing member 12. Of course, in applying the cover and bezel to the housing member 12, the keying elements of the knobs 260 and 262 have to be suitably applied to the sockets of the devices forming the span adjust 212A and the zero adjust 248A.

In the specific form illustrated, the gauge 10 is shown applied to a conventional U shaped mounting bracket 330 (see FIG. 2) that is fixed to the back wall 22 of the housing member 12 by suitable nuts 332 and 334 respectively applied to threaded stud members 336 and 338 that are suitably mounted in threaded apertures formed in the housing back wall 22 for mounting purposes. Of course any suitable mounting means for gauge 10 may be employed in accordance with the skill of the art to position same for use in accordance with the invention.

With regard to the span adjust 212A and the zero adjust 248A, instead of the knob type of adjustments represented by the knobs 260 and 262, the potientiometer devices involved may be equipped with an adjustment rotor slotted for application thereto of a screw drive blade through apertures located at the locations of the respective knobs 260 which apertures (not shown) may be removably closed by suitable access plugs, in any convenient manner so that the adjustments for these components are not readily accessible.

Figure 8:
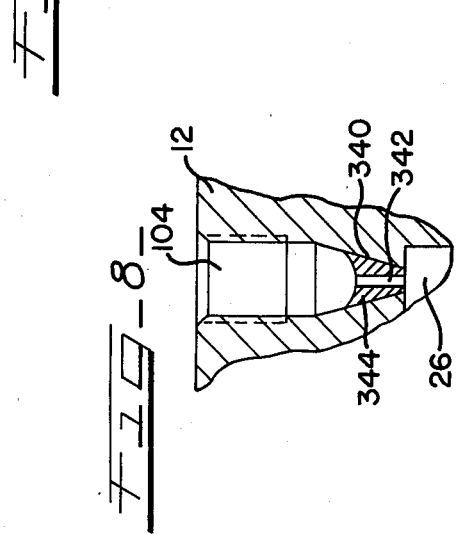
FIG. 8 is a fragmental cross-sectional view taken substantially along line 8—8 of FIG. 6, shown on a substantially enlarged scale.

The housing connection to the low pressure chamber 26 (see FIG. 8) has its inner end of funnel configuration where indicated at 340 that is shaped to provide relatively small inlet bore 342 by filling same with a suitable epoxy resin 344 and drilling bore 342 therethrough at a diameter approximating 0.05 inch, surge etc.

It will therefore be seen that the invention provides a special type of strain gauge transducer pressure gauge wherein the sensitivity of the gauge is independent of the size of the diaphragm in terms of diameter, and the diaphragam is preferably a relatively inexpensive elastomeric diaphragm.

The electronic circuit 96 when excited as indicated, insures the needed uniform or constant voltage input to the transducer bridge 95, and the 15 direct current volts involved minimizes heat developed by the resistance of the sensing elements making up the bridge 95, thereby enhancing the accuracy of the gauge read out.

As the components of circuit 96 are mounted on circuit board 98 that in turn is rigid and made fast to the housing member 12, the transducer 10 is highly resistant to shock and vibration. Further, the arrangement of the transducer is such that it can tolerate repeated over pressurization to the maximum pressure limit without damage or need for recalibration.

As indicated, the signal provided by the gauge may be for gauge or differential pressures and the output signal can be used for remote indication or for application to control systems.

In commercial embodiments of the invention, one series of models of the gauge have operating ranges available from zero to about 15 inches of water column, and another series of models of the gauge have operating ranges available from zero to about 20 psi. The leaf spring mounting of the pressures sensing transducer, as distinguished from the application of same to a metal diaphragm, is believed to be a key factor in the low pressure operation that is achieved by the practice of the invention.

The transducer hereindisclosed is ideal for application in commercial and industrial energy management systems. For instance, the transducer may be employed for the control of variable speed fans and blowers as well as the positioning of system dampers. Continuous data on air velocities in ducts and pressure drops across air filters can be supplied utilizing the transducer to a controlling computer. Similar applications can be satisfied in environmental control systems. In the medical field, the transducer can interface with computer controlled equipment to provide blood and respiratory pressure input data. The transducer also finds wide application in process control systems.

Wherever it is necessary to provide continuous recording or control of any low air or gas system pressure, this pressure transducer will do the job.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. In a pressure gauge that comprises a housing having a pressure cavity across which is mounted a flexible diaphragm separating high and low pressure chambers, a leaf spring secured within the housing high pressure chamber in overlying relation to the diaphragm on one side of the diaphragm and being mounted cantilever fashion at one end thereof, clamping means for clamping said leaf spring to said housing adjacent said one end thereof for defining the live length of said spring and a fulcrum about which said spring live length moves, and a link connecting said diaphragm to said live length of said leaf spring for deflection of said leaf spring in response to differential pressures acting on either side of the diaphragm within the housing;

the improvement wherein:

said live length of said leaf spring has affixed to same a strain gauge comprising four square grid sensing elements connected in Wheatstone bridge, self temperature compensated, fashion with two alternate grids extending longitudinally of said leaf spring and the other two grids extending transversely thereof, said strain gauge being connected in an electronic circuit mounted in said housing and the sensing elements thereof being balanced when the diaphragm and leaf spring are free of deflection, a circuit board fixedly mounted in said housing on said side of the diaphragm and overlying and spaced from said leaf spring in substantial parallelism thereto, said electronic circuit being mounted on said circuit board and including means for supplying a constant D.C. voltage to said strain gauge and means for amplifying the strain gauge signal generated by deflection of said leaf spring live length from the deflection free relation thereof to an output for effecting sensing of the action of the differential pressures acting on either side of the diaphragm.

2. The improvement set forth in claim 1 wherein:

said strain gauge signal is proportional to the pressure signal sensed by said diaphragm in deflecting said leaf spring live length from said deflection free relation thereof to provide said output.

3. The improvement set forth in claim 2 wherein:

said circuit board is of rigid construction, with said strain gauge being located in close proximity to said fulcrum.

4. The improvement set forth in claim 2 wherein:

said sensing elements are formed from foil and each have approximately the same ratio of surface area to cross sectional area, with said ratio being relatively large, said sensing elements being substantially matched for self temperature compensating purposes.

5. The improvement set forth in claim 1 wherein:

said electronic circuit includes a first manually setable potentiometer means for setting the operating range of the gauge, and a second manually settable potentiometer means for setting the gauge zero adjust when the diaphragm and leaf spring are free of deflection, whereby said output approximates four milli-amps.

6. The improvement set forth in claim 1 wherein:

said housing is formed for separately connecting said high and low pressure chambers to sources of high and low pressure fluids, respectively.

7. In a differential pressure gauge comprising a housing having a pressure cavity defined thereby across which is mounted a flexible diaphragm separating high and low pressure chambers in the gauge, a leaf spring disposed in said housing in overlying relation to said diaphragm on one side of same and being anchored to said housing cantilever fashion at one end thereof, link means for connecting said diaphragm to said leaf spring, whereby deflection of the diaphragm under differential pressures in said chambers produces linear movement of said leaf spring other end, and means for separately connecting said high and low pressure chambers to sources of high and low pressure fluids, respectively, the improvement wherein:

said housing comprises a housing member having a rear wall on the back side of same and being open on the front side of same, said rear wall having a recess formed in same on the inside of same on the other side of the diaphragm defining with the diaphragm the gauge low pressure chamber, said housing having a cover removably mounted on the front side of same forming with the diaphragm the gauge high pressure chamber, said diaphragm having a circular periphery, means for clamping said diaphragm periphery against said housing member about said recess for sealing said low pressure chamber from said high pressure chamber, clamping means for clamping said leaf spring to said housing adjacent the diaphragm periphery for defining the live length of said leaf spring and a fulcrum about which said spring live length moves on said deflection of the diaphragam, said leaf spring live length being deflection free when said high and lower pressure chambers are at equal atmospheric pressures, said live length of said leaf spring having affixed to same a strain gauge comprising four square grid sensing elements connected in Wheatstone bridge fashion with two alternate grids extending longitudinally of said leaf spring and the other two grids extending transversely thereof, said strain gauge being incorporated in an electronic circuit mounted in said housing and the sensing elements thereof being balanced when the diaphragm and leaf spring are free of deflection, a circuit board fixedly mounted in said housing on said one side of the diaphragm and overlying and spaced from said leaf spring in substantial parallelism thereto, said electronic circuit being mounted on said circuit board and including means for supplying a constant voltage to said strain gauge and means for amplifying the strain gauge signal generated by deflection of said leaf spring live length from the deflection free relation thereof to an output for effecting sensing of the action of the differential pressures acting on either side of the diaphragm.

8. The improvement set forth in claim 7 wherein:

said sensing elements are each etch formed from constantan foil and having a ratio of surface area to cross sectional area approximately 190 to 1.

9. The improvement set forth in claim 7 wherein:

said diaphragm is formed from an elastomeric material.

10. The improvement set forth in claim 8 wherein:

said foil sensing elements are resin bonded to said leaf spring, said strain gauge being located in close proximity to said fulcrum on said live length of said leaf spring, said output being in milliamps in the range of from about four to about twenty milliamps, or being in millivolts in the range of from about one to about five millivolts.

* * * * *